United States Patent
Malvar

(10) Patent No.: US 7,110,610 B2
(45) Date of Patent: Sep. 19, 2006

(54) SYSTEM AND METHOD FOR PROGRESSIVELY TRANSFORMING AND CODING DIGITAL DATA

(75) Inventor: Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/215,595

(22) Filed: Aug. 30, 2005

(65) Prior Publication Data

US 2005/0281472 A1 Dec. 22, 2005

Related U.S. Application Data

(63) Continuation of application No. 10/109,291, filed on Mar. 27, 2002, now Pat. No. 7,006,699.

(51) Int. Cl.
G06K 9/46 (2006.01)
G06K 9/36 (2006.01)
G06K 9/38 (2006.01)

(52) U.S. Cl. .................................. 382/240; 382/244
(58) Field of Classification Search ................ 382/162, 382/166, 173, 232, 240, 244, 248, 250, 251; 375/240.03, 240.18, 240.19, 240.2, 260; 358/432, 433, 523, 525, 505, 530; 704/204, 704/230; 708/400; 345/600–604
See application file for complete search history.

(56) References Cited

U.S. PATENT DOCUMENTS

| | | | | |
|---|---|---|---|---|
| 5,497,398 | A * | 3/1996 | Tzannes et al. | 375/260 |
| 6,073,153 | A * | 6/2000 | Malvar | 708/400 |
| 6,101,279 | A * | 8/2000 | Nguyen et al. | 382/240 |
| 6,253,165 | B1 * | 6/2001 | Malvar | 703/2 |
| 6,256,608 | B1 * | 7/2001 | Malvar | 704/230 |
| 6,625,216 | B1 * | 9/2003 | Zhu | 375/240.16 |
| 6,636,830 | B1 * | 10/2003 | Princen et al. | 704/204 |

(Continued)

OTHER PUBLICATIONS

Henrique S. Malvar. "Lapped Biorthogonal Transforms for Transform Coding with Reduced Blocking and Ringing Artifacts", pp. 1-4.

(Continued)

Primary Examiner—Amir Alavi
(74) Attorney, Agent, or Firm—Amin & Turocy, LLP

(57) ABSTRACT

A system and method facilitating progressively transforming and coding digital pictures is provided. The present invention via employment of a multi-resolution lapped transform provides for progressive rendering as well as mitigation of blocking artifacts and ringing artifacts as compared to many conventional compression systems. The invention includes a color space mapper, a multi-resolution lapped transform, a quantizer, a scanner and an entropy encoder. The multi-resolution lapped transform outputs transform coefficients, for example, first transform coefficients and second transform coefficients. A multi-resolution representation can be obtained utilizing second transform coefficients of the multi-resolution lapped transform. The color space mapper maps an input image to a color space representation of the input image. The color space representation of the input image is then provided to the multi-resolution lapped transform. The quantizer receives the first transform coefficients and/or the second transform coefficients and provides an output of quantized coefficients for use by the scanner and/or the entropy encoder. The scanner scans the quantized coefficients in order to produce a one-dimensional vector for use by the entropy encoder. The entropy encoder encodes the quantized coefficients received from the quantizer and/or the scanner resulting in data compression.

19 Claims, 19 Drawing Sheets

U.S. PATENT DOCUMENTS

| | | | |
|---|---|---|---|
| 6,909,812 B1* | 6/2005 | Faryar et al. | 382/251 |
| 6,937,659 B1* | 8/2005 | Nguyen et al. | 375/240.19 |
| 7,006,699 B1* | 2/2006 | Malvar | 382/240 |
| 2002/0110280 A1* | 8/2002 | Prakash et al. | 382/240 |
| 2003/0185439 A1* | 10/2003 | Malvar | 382/166 |
| 2005/0276472 A1 | 12/2005 | Malvar | |
| 2005/0276491 A1* | 12/2005 | Malvar | 382/233 |
| 2005/0276494 A1* | 12/2005 | Malvar | 382/240 |
| 2005/0281472 A1* | 12/2005 | Malvar | 382/232 |
| 2006/0023958 A1* | 2/2006 | Malvar | 382/232 |

OTHER PUBLICATIONS

Henrique S. Malvar. "Biorthogonal and Nonuniform Lapped Tranforms for Transform Coding with Reduced Blocking and Ringing Artifacts", Oct. 20, 1997, pp. 1-29.

Henrique S. Malvar, "Fast Progressive Wavelet Coding", pp. 1-8.

Henrique S. Malvar. "Fast Progressive Image Coding without Wavelets", pp. 1-10.

B. Deknuydt, et al., "Color Space Choice for Nearly Reversible Image Compression", 1300/SPIE vol. 1818 Visual Communications and Image Processing, Nov. 1992, Boston, MA.

* cited by examiner

|    | 0 | 1 | 2 | 3 | 4 | 5 | 6 | 7 | 8 | 9 | 10 | 11 | 12 | 13 | 14 | 15 |    |
|----|---|---|---|---|---|---|---|---|---|---|----|----|----|----|----|----|----|
| 0  | D | 0 | 1 | 1 | D | 0 | 1 | 1 | D | 0 | 1  | 1  | D  | 0  | 1  | 1  | 0  |
| 1  | 0 | 0 | 1 | 1 | 0 | 0 | 1 | 1 | 0 | 0 | 1  | 1  | 0  | 0  | 1  | 1  | 1  |
| 2  | 2 | 2 | 3 | 3 | 2 | 2 | 3 | 3 | 2 | 2 | 3  | 3  | 2  | 2  | 3  | 3  | 2  |
| 3  | 2 | 2 | 3 | 3 | 2 | 2 | 3 | 3 | 2 | 2 | 3  | 3  | 2  | 2  | 3  | 3  | 3  |
| 4  | D | 0 | 1 | 1 | D | 0 | 1 | 1 | D | 0 | 1  | 1  | D  | 0  | 1  | 1  | 4  |
| 5  | 0 | 0 | 1 | 1 | 0 | 0 | 1 | 1 | 0 | 0 | 1  | 1  | 0  | 0  | 1  | 1  | 5  |
| 6  | 2 | 2 | 3 | 3 | 2 | 2 | 3 | 3 | 2 | 2 | 3  | 3  | 2  | 2  | 3  | 3  | 6  |
| 7  | 2 | 2 | 3 | 3 | 2 | 2 | 3 | 3 | 2 | 2 | 3  | 3  | 2  | 2  | 3  | 3  | 7  |
| 8  | D | 0 | 1 | 1 | D | 0 | 1 | 1 | D | 0 | 1  | 1  | D  | 0  | 1  | 1  | 8  |
| 9  | 0 | 0 | 1 | 1 | 0 | 0 | 1 | 1 | 0 | 0 | 1  | 1  | 0  | 0  | 1  | 1  | 9  |
| 10 | 2 | 2 | 3 | 3 | 2 | 2 | 3 | 3 | 2 | 2 | 3  | 3  | 2  | 2  | 3  | 3  | 10 |
| 11 | 2 | 2 | 3 | 3 | 2 | 2 | 3 | 3 | 2 | 2 | 3  | 3  | 2  | 2  | 3  | 3  | 11 |
| 12 | D | 0 | 1 | 1 | D | 0 | 1 | 1 | D | 0 | 1  | 1  | D  | 0  | 1  | 1  | 12 |
| 13 | 0 | 0 | 1 | 1 | 0 | 0 | 1 | 1 | 0 | 0 | 1  | 1  | 0  | 0  | 1  | 1  | 13 |
| 14 | 2 | 2 | 3 | 3 | 2 | 2 | 3 | 3 | 2 | 2 | 3  | 3  | 2  | 2  | 3  | 3  | 14 |
| 15 | 2 | 2 | 3 | 3 | 2 | 2 | 3 | 3 | 2 | 2 | 3  | 3  | 2  | 2  | 3  | 3  | 15 |

700

Group 2
Group 3
Group 4
Group 5

BLOCK

FIG. 7

SYSTEM AND METHOD FOR PROGRESSIVELY TRANSFORMING AND CODING DIGITAL DATA

RELATED APPLICATIONS

This application is a continuation of U.S. patent application Ser. No. 10/109,291, entitled "System and Method for Progressively Transforming and Coding Digital Data," filed Mar. 27, 2002 now U.S. Pat. No. 7,006,699. This application is also related to co-pending U.S. patent application Ser. No. 11/206,506, entitled "System and Method for Progressively Transforming and Coding Digital Data," filed Aug. 18, 2005, co-pending U.S. patent application Ser. No. 11/206,507, entitled "System and Method for Progressively Transforming and Coding Digital Data," filed Aug. 18, 2005, co-pending U.S. patent application Ser. No. 11/206,508, entitled "System and Method for Progressively Transforming and Coding Digital Data," filed Aug. 18, 2005, and co-pending U.S. patent application Ser. No. 11/206,390, entitled "System and Method for Progressively Transforming and Coding Digital Data," filed on Aug. 18, 2005; all of which are hereby incorporated by reference.

TECHNICAL FIELD

The present invention relates generally to digital picture processing, and more particularly to a system and method facilitating picture encoding and/or decoding.

BACKGROUND OF THE INVENTION

The amount of information available via computers has dramatically increased with the wide spread proliferation of computer networks, the Internet and digital storage means. With such increased amount of information has come the need to transmit information quickly and to store the information efficiently. Data compression is a technology that facilitates the effective transmitting and storing of information Data compression reduces an amount of space necessary to represent information, and can be used for many information types. The demand for compression of digital information, including images, text, audio and video has been ever increasing. Typically, data compression is used with standard computer systems; however, other technologies make use of data compression, such as but not limited to digital and satellite television as well as cellular/digital phones.

As the demand for handling, transmitting and processing large amounts of information increases, the demand for compression of such data increases as well. Although storage device capacity has increased significantly, the demand for information has outpaced capacity advancements. For example, an uncompressed digital picture can require 5 megabytes of space whereas the same picture can be compressed without loss and require only 2.5 megabytes of space. Thus, data compression facilitates transferring larger amounts of information. Even with the increase of transmission rates, such as broadband, DSL, cable modem Internet and the like, transmission limits are easily reached with uncompressed information. For example, transmission of an uncompressed image over a DSL line can take ten minutes. However, the same image can be transmitted in about one minute when compressed thus providing a ten-fold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data integrity compromise is tolerated. Lossless compression may be used, for example, when compressing critical text, because failure to reconstruct exactly the data can dramatically affect quality and readability of the text. Lossy compression can be used with pictures or non-critical text where a certain amount of distortion or noise is either acceptable or imperceptible to human senses.

Picture compression is a particularly important technical problem, because digital pictures are a significant portion of the information growth referred to previously. Most Web pages today contain many pictures, and many office documents also contain several pictures. The use of digital cameras keeps growing at a fast pace; many users have literally thousands of pictures taken from such cameras.

One of the most popular and widely used techniques of picture compression is the Joint Photographic Experts Group (JPEG) standard. The JPEG standard operates by mapping an 8×8 square block of pixels into the frequency domain by using a discrete cosine transform (DCT). Coefficients obtained by the DCT are divided by a scale factor and rounded to the nearest integer (a process known as quantizing) and then mapped to a one-dimensional vector via a fixed zigzag scan pattern. This one-dimensional vector is encoded using a combination of run-length encoding and Huffman encoding.

Although JPEG is a popular and widely used compression technique, it has several disadvantages. For example, one disadvantage of JPEG is that at low bit rates the DCT produces irregularities and discontinuities in a reconstructed image (known as tiling or blocking artifacts). Blocking artifacts cause the boundary between groups of 8×8 blocks of pixels to become visible in the reconstructed image. These blocking artifacts cause an undesirable degradation in image quality. Another disadvantage of JPEG is that JPEG cannot perform image reconstruction that is progressive in fidelity. In other words, if an image is encoded at a certain fidelity and a lower fidelity is later desired (for example, due to limited bandwidth or storage availability), the image must be decoded and re-encoded.

Some of the disadvantages of JPEG are mitigated by the new JPEG2000, which replaces the DCT by wavelet transforms. Although wavelets provide smooth signal reconstruction without blocking artifacts, they can lead to an increase in blurring and ringing artifacts. Furthermore, JPEG2000 uses a relatively complex coefficient encoding system, resulting in a compression technique that can be 3× (or more) slower than JPEG.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a digital picture compression system and methodology that employs a multi-resolution lapped transform that receives input values (e.g., from a color space mapper), and provides for progressive rendering. The multi-resolution lapped transform utilizes hierarchical lapped bi-orthogonal transforms that mitigate "blocking artifacts" associated with many conventional picture compression systems employing discrete cosine transform (DCT), such as JPEG. Further, the use of bi-orthogonal lapped transforms reduces noticeable "ringing artifacts" compared with conventional DCT-based picture compression systems.

One particular aspect of the invention provides for a picture compression system having the color space mapper, the multi-resolution lapped transform, a quantizer, a scanner and/or an entropy encoder. The multi-resolution lapped transform outputs transform coefficients, for example, first transform coefficients and second transform coefficients. A multi-resolution representation can be obtained utilizing second transform coefficients of the multi-resolution lapped transform. The color space mapper maps an input image to a color space representation of the input image (e.g., YUV and/or $YC_OC_G$). The color space representation of the input image is then provided to the multi-resolution lapped transform. The quantizer receives the first transform coefficients and/or the second transform coefficients and provides an output of quantized coefficients for use by the scanner and/or the entropy encoder. The scanner scans the quantized coefficients in order to produce a one-dimensional vector for use by the entropy encoder. A Peano-like scanning order can be utilized by the scanner. The entropy encoder encodes the quantized coefficients received from the quantizer and/or the scanner resulting in data compression. The entropy encoder can utilize an adaptive run-length encoder.

Another aspect of the present invention provides for a picture compression system having a color space mapper, a lossless transform and an entropy encoder. The lossless transform receives input values from the color space mapper and utilizes a lossless transform (e.g., a hierarchical Hadamard transform).

Yet another aspect of the present invention provides for a picture decompression system having an entropy decoder, an inverse transform and a reverse color space mapper. The entropy decoder receives a bit stream (e.g., produced by a corresponding entropy encoder) and decodes the bit stream. The entropy decoder can utilize an adaptive run-length decoder.

The inverse transform receives input values from the entropy decoder and utilizes inverse transforms (e.g., inverse hierarchical lapped bi-orthogonal or inverse hierarchical Hadamard). The inverse transform provides output values to the reverse color space mapper. The reverse color space mapper maps input values (e.g., YUV and/or $YC_OC_G$) to an RGB output image.

Another aspect of the present invention provides for the picture compression system to be employed in a vast array of document image applications, including, but not limited to, segmented layered image systems, photocopiers, document scanners, optical character recognition systems, personal digital assistants, fax machines, digital cameras, digital video cameras and/or video games.

Other aspects of the present invention provide methods for data compression/encoding, data decompression/decoding, scanning a chunk of coefficients, color mapping and reverse color mapping. Further provided are a computer readable medium having computer usable instructions for a system for picture compression and a computer readable medium having computer usable instructions for a system for picture decompression. Also provided is a data packet adapted to be transmitted between two or more computer processes comprising information associated that facilitates data compression, the information comprising first transform coefficients based, at least in part, upon a lapped bi-orthogonal transform of input values, and second transform coefficients based, at least in part, upon a lapped bi-orthogonal transform of at least one first transform coefficient. A data packet adapted to be transmitted between two or more computer components that facilitates data compression comprising a data field comprising first transform coefficients based, at least in part, upon a hierarchical Hadamard transform of input values, and, second transform coefficients based, at least in part, upon a hierarchical Hadamard transform of at least one first transform coefficient is further provided.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 7 is a block diagram illustrating a Peano-like scanning pattern for a sixteen by sixteen data macroblock in accordance with an aspect of the present invention.

DETAILED DESCRIPTION OF THE INVENTION

Figure 1:
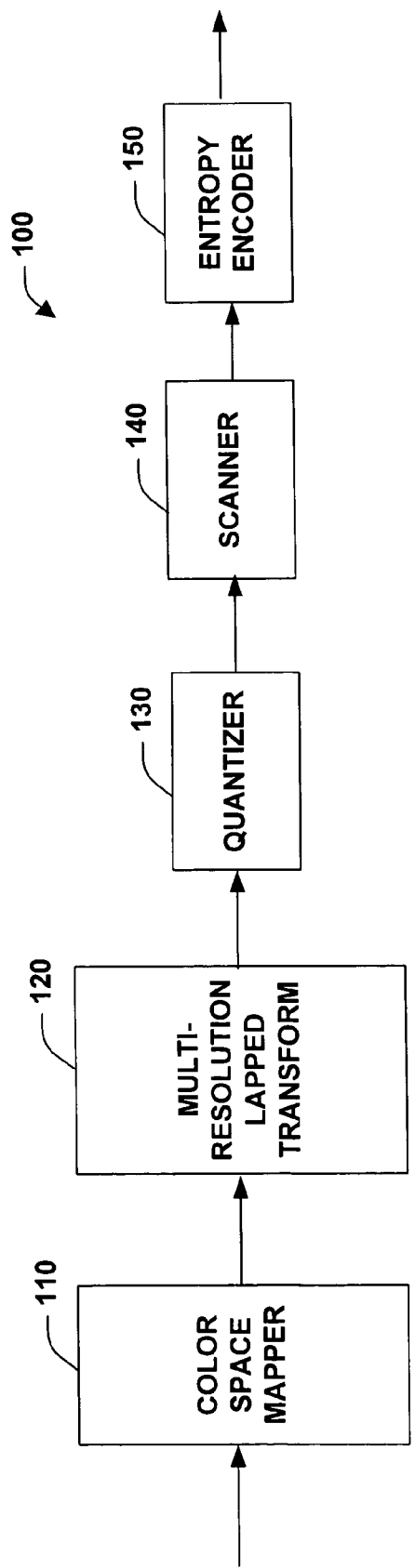
FIG. 1 is a block diagram of a picture compression system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a picture compression system 100 in accordance with an aspect of the present invention is illustrated. As noted above, the system 100 of the present invention via employment of a multi-resolution lapped transform 120 provides for progressive rendering as well as mitigation of blocking artifacts and ringing artifacts as compared to many convention compression systems. The picture compression system 100 includes a color space mapper 110, a multi-resolution lapped transform 120, a quantizer 130, a scanner 140 and an entropy encoder 150.

The color space mapper 110 maps an input image to a color space representation of the input image. The color space representation of the input image is then provided to the multi-resolution lapped transform 120. In one example, the color space mapper 110 maps the input image to a YUV representation of an RGB input image (e.g., represented by red, green and blue components). A YUV representation uses a luminance component denoted by Y and chrominance-red denoted by U and chrominance-blue denoted by V.

In another example, the color space mapper 110 maps the input image to a $YC_oC_g$ representation. The $YC_oC_g$ representation utilizes luminance represented by Y, chrominance-orange represented by $C_o$ and chrominance-green represented by $C_g$. The RGB input components are mapped to $YC_oC_g$ (e.g., as an alternative to the conventional YUV described above) utilizing the transform:

$$\begin{bmatrix} Y \\ C_o \\ C_g \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix} \Leftrightarrow \begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ C_o \\ C_g \end{bmatrix} \quad (1)$$

Significantly, an advantage of $YC_oC_g$ color space mapping is that mapping from RGB to $YC_oC_g$ and the inverse conversion from $YC_oC_g$ to RGB can be accomplished utilizing integer arithmetic, thus reducing computational overhead. Further, the inverse conversion can be performed without multiplication. The $YC_oC_g$ color space representation can result in significantly better compression performance than the popular YUV because it is a better approximation to statistically optimal spaces that are obtained from a principal component analysis on modern digital picture data.

It is to be appreciated that numerous other color space representations are contemplated conducive to facilitating data compression utilizing a multi-resolution lapped transform in connection with the subject invention. Any suitable color space representation for employment in connection with the present invention is intended to fall within the scope of the appended claims. Further, any suitable computer process(es) can be performed by the color space mapper 110 (e.g., integer and/or floating point) in accordance with the present invention.

The multi-resolution lapped transform 120 receives input values, for example, from the color space mapper 110. The multi-resolution lapped transform 120 can allow the picture compression system 100 to have progressive rendering. The multi-resolution lapped transform 120 utilizes hierarchical lapped bi-orthogonal transforms. By using lapped transforms, "blocking artifacts" of conventional picture compression systems employing discrete cosine transform (DCT), such as JPEG, can be reduced. Further, the use of lapped bi-orthogonal transforms reduces noticeable "ringing artifacts" compared with conventional DCT-based picture compression systems.

Figure 2:
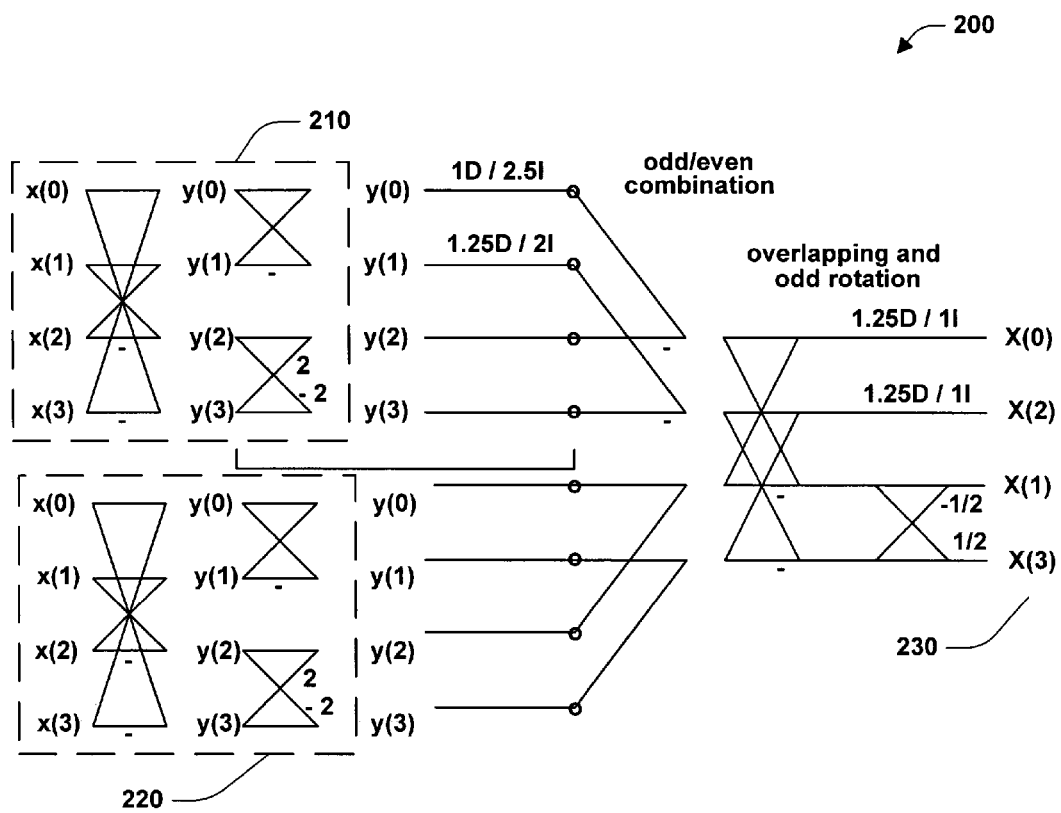
FIG. 2 is a block diagram of a bi-orthogonal lapped transform in accordance with an aspect of the present invention.

Referring briefly to FIG. 2, a lapped bi-orthogonal transform (LBT) 200 in accordance with an aspect of the present invention is illustrated. The LBT 200 includes a first DCT-like transform 210 (e.g., similar to a DCT, but not identical to it) having four inputs x(0), x(1), x(2) and x(3), associated with a first block of data. The LBT 200 also includes second DCT-like transform 220 having four inputs x(0), x(1), x(2) and x(3) associated with a second block of data. The LBT 200 has four outputs 230, X(0), X(1), X(2) and X(3). As illustrated in FIG. 2, in the direct transform (e.g., data compression/encoding), data is processed from left to right, and in the inverse transform (e.g., data decompression/decoding) data is processed from right to left. The scaling factors can be different for the direct (D) and inverse (I) transforms.

In order to perform the lapping portion of the transform, the output 230 for a block of data input to the second DCT-like transform 220 is dependent upon the inputs of a previous block of data input to the first DCT-like transform 210. In the instance where no previous block of data has been input (e.g., upon initialization and/or at corner(s) of a picture), the input values to the first DCT-like transform 210 would not be completely defined. Specifically x(0) and x(1) fall outside the picture boundary if the first DCT-like transform 210 is the first one for a row or column. In that case, an exemplary solution is to use even-symmetric extension, by setting x(1)=x(2) and x(0)=x(3). A similar symmetric reflection is applied to the last DCT-like transform 210 for a picture row or column. In both cases, it is easy to see that the first and last DCT-like transform 210 for a row or column can be replaced by simple 2×2 operators (e.g., two distinct inputs, two distinct outputs).

In one example, substantially all computations in the LBT 200 can be accomplished using only integer arithmetic and no multiplications. For example, for a given value z, a new value z/2 is implemented as a right shift: z>>1. Further, the quantity 1.25z can be implemented by adding right shifting z twice and adding that amount to z (e.g., z+(z>>2)). While this implementation can result in small truncation errors produced by the shifts (as long as the data is appropriately scaled), notably the implementation is generally processor independent, since the result will typically be the same regardless of the processor used to perform the transform. Accordingly, substantially all implementations of the systems and methods of the present invention can lead to substantially similar compressed files for the same original picture bitmap, unlike conventional data compression systems such as JPEG, MPEG, and other standards.

Figure 3:
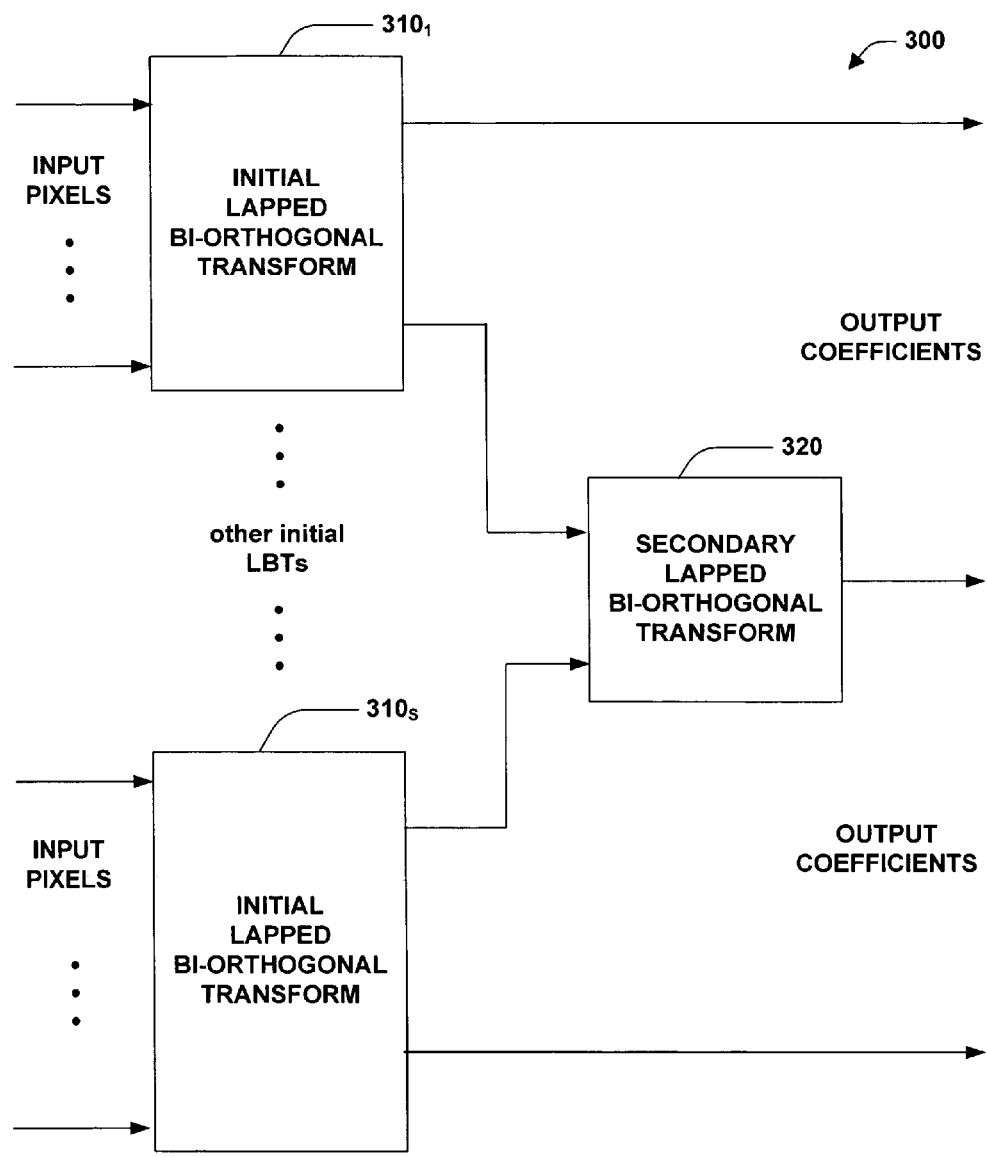
FIG. 3 is a block diagram of a multi-resolution lapped transform in accordance with an aspect of the present invention.

Turning briefly to FIG. 3, a multi-resolution lapped transform 300 in accordance with an aspect of the present invention is illustrated. The multi-resolution lapped transform 300 includes a first initial LBT $310_1$ through an Sth initial LBT $310_S$, S being an integer greater than or equal to one. The first initial LBT $310_1$ through the Sth initial LBT $310_S$ can be referred to collectively as the initial LBT 310. The multi-resolution lapped transform 300 also includes a secondary LBT 320. The multi-resolution lapped transform 300 can be utilized, for example, by the multi-resolution lapped transform 120.

The initial LBT 310 receives input values (e.g., from the color space mapper 110). The initial LBT 310 processes the input values and outputs first transform coefficients based, at least in part, upon a lapped bi-orthogonal transform of the input values. For example, the initial LBT 310 can utilize the exemplary LBT 200 set forth previously.

First transform coefficient(s) of the first initial LBT $310_1$ through the Sth initial LBT $310_S$ are provided as inputs to the secondary LBT 320. In one example, the low frequency coefficient (e.g., DC) is provided by the initial LBT 310 to the secondary LBT 320. The secondary LBT 320 processes the first transform coefficient(s) and outputs second transform coefficient(s) based, at least in part, upon a lapped bi-orthogonal transform of the input first transform coefficient(s). For example, the secondary LBT 320 can utilize the exemplary LBT 200 set forth previously.

A multi-resolution representation can be obtained utilizing second transform coefficients of the secondary lapped bi-orthogonal transform 320. For example, a bit map reconstructed by applying only the second level of an inverse hierarchical LBT would recover a picture bitmap that represents a 4×-downsampled version of the original comparable to an image resulting from conventional bicubic down-sampling filter(s).

Figure 4:
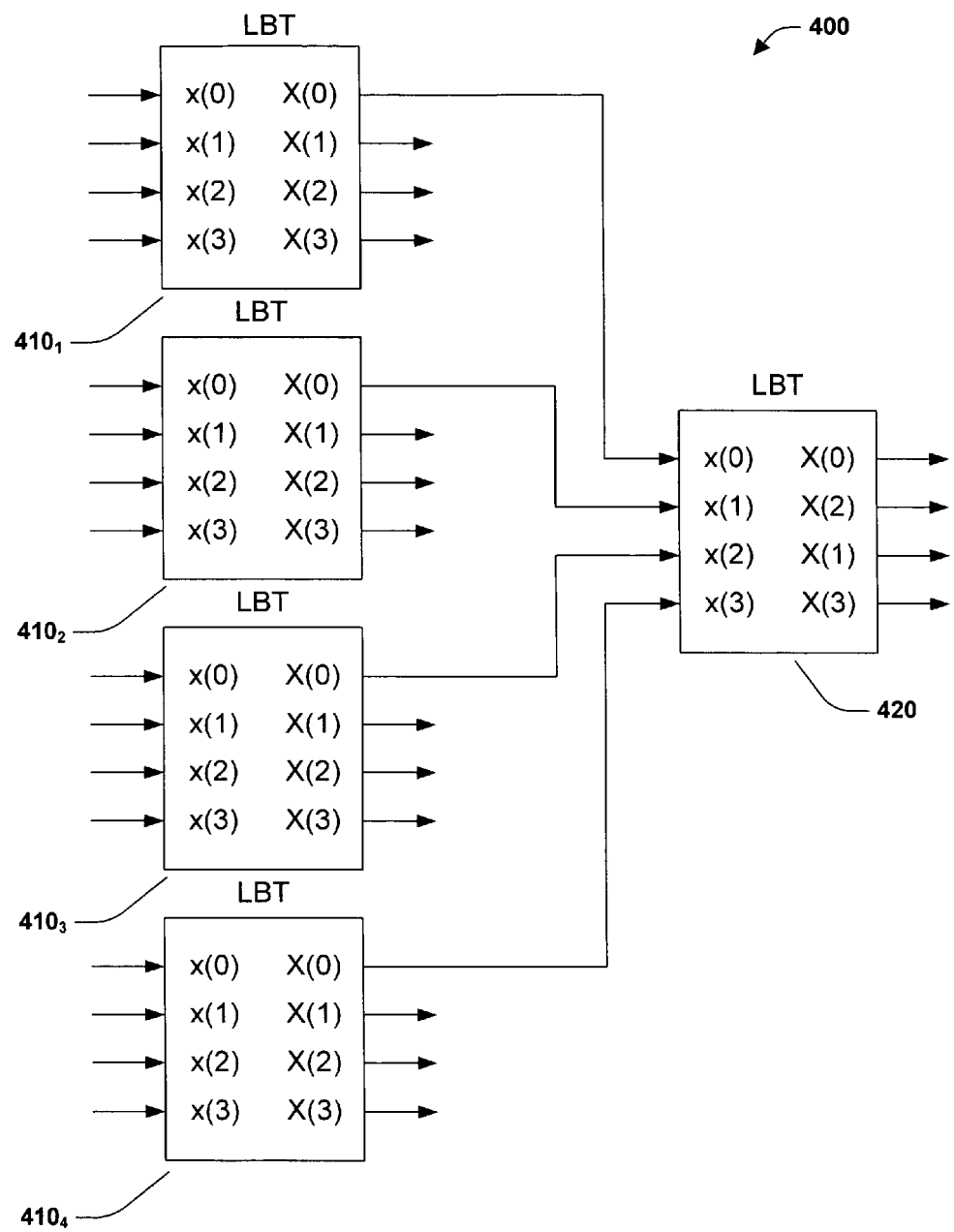
FIG. 4 is a block diagram of a multi-resolution lapped transform in accordance with an aspect of the present invention.

Referring briefly to FIG. 4, a multi-resolution lapped transform 400 in accordance with an aspect of the present invention is illustrated. The transform 400 includes a first initial LBT $410_1$, a second initial LBT $410_2$, a third initial LBT $410_3$, a fourth initial LBT $410_4$ and a secondary LBT 420. The low frequency coefficient output of the first initial LBT $410_1$, the second initial LBT $410_2$, the third initial LBT $410_3$ and the fourth initial LBT $410_4$ are provided as inputs to the secondary LBT 420. The multi-resolution lapped transform 400 can be utilized, for example, by the multi-resolution lapped transform 120.

Figure 5:
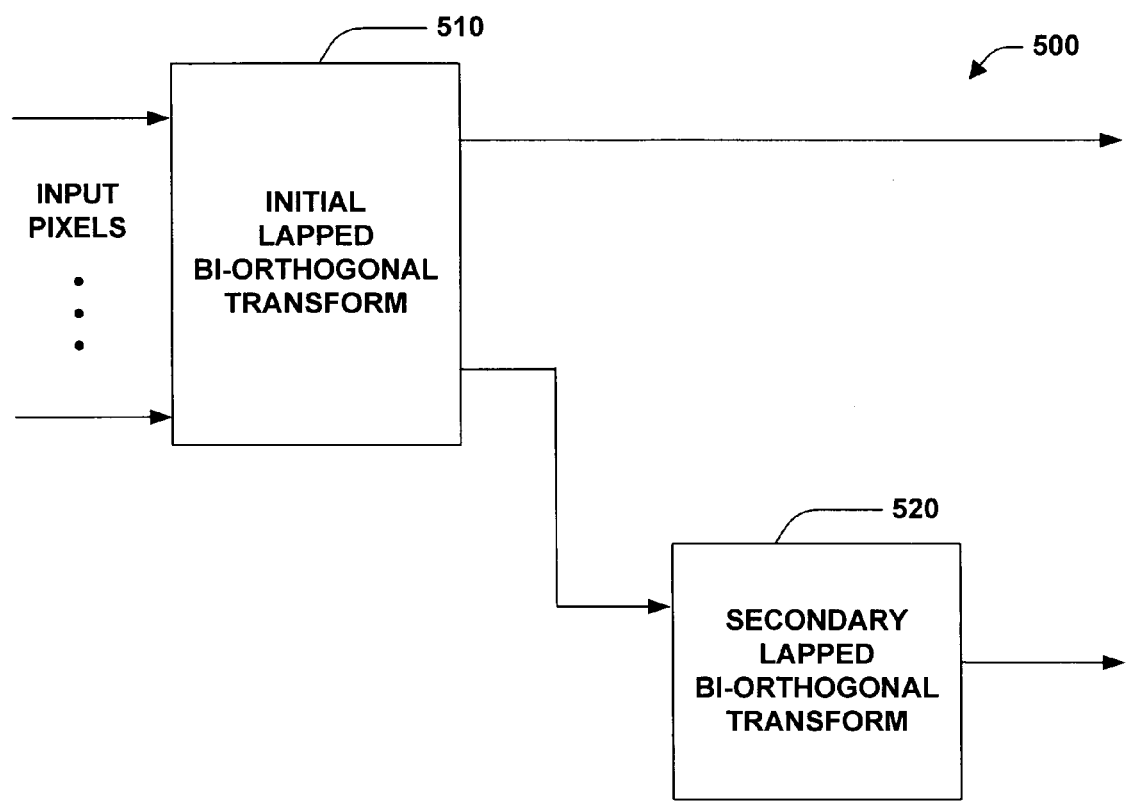
FIG. 5 is a block diagram of a multi-resolution lapped transform in accordance with an aspect of the present invention.

Next, turning to FIG. 5, a multi-resolution lapped transform 500 in accordance with an aspect of the present invention is illustrated. The transform 500 includes an initial LBT 510 and a secondary LBT 520. The low frequency coefficient outputs of the initial LBT 510 are sequentially provided to the secondary LBT 520. The secondary LBT 520 provides a second level coefficient output once sufficient low frequency coefficients have been received from the initial LBT 510. The multi-resolution lapped transform 500 can be utilized, for example, by the multi-resolution lapped transform 120.

For processing images, a two-dimensional transform is utilized. To achieve the two-dimensional transform, the LBTs discussed previously can be applied to the rows and columns of the input values (e.g., of each of the Y, $C_o$, and $C_g$ received from the color space mapper 110). In one example, in order to reduce computational overhead, entire columns are not processed, since each column access spans almost the entire bitmap array which would require off-cache memory access. Instead, in accordance with the present invention, an internally "rolling buffer" approach, in which part of the column transform is performed after each set of four rows is processed can be utilized. In this manner, the two-dimensional transform can be computed in only one scan of the original bitmap.

Referring back to FIG. 1, the quantizer 130 receives the first transform coefficients and/or the second transform coefficients and provides an output of quantized coefficients for use by the scanner 140 and/or the entropy encoder 150. The quantizer 130 typically introduces a loss of information into the picture compression system 100. The loss results from the quantization of the coefficient, since for a transformed value Y, its quantized version is typically given by r=int[(Y+f)/s], where s is a step size of the quantizer 130, with |f| typically equal to s/2 and sign(f)=sign(Y). Thus, as the step size s increases, the corresponding dynamic range of r is reduced as is the likelihood of r equaling zero. During decompression (e.g., decoding), an approximation to Y is recovered typically by Ŷ=r×s. Accordingly, the smaller the step size s the closer the approximation Ŷ≈Y. As the step size increases, typically data compression is more effective; however, greater loss is introduced. In one example, in order to reduce computational overhead, the quantizer 130 utilizes integer arithmetic, e.g., by scaling the values by an integer factor Z, and approximating Z/s by an integer.

The scanner 140 scans the quantized coefficients in order to produce a one-dimensional vector for use by the entropy encoder 150. In one example, the scanner 140 utilizes row-wise scanning, while in another example, the scanner utilizes column-wise scanning. In yet another example, the scanner 140 utilizes a zigzag pattern, such as in conventional JPEG data compression systems.

Figure 6:
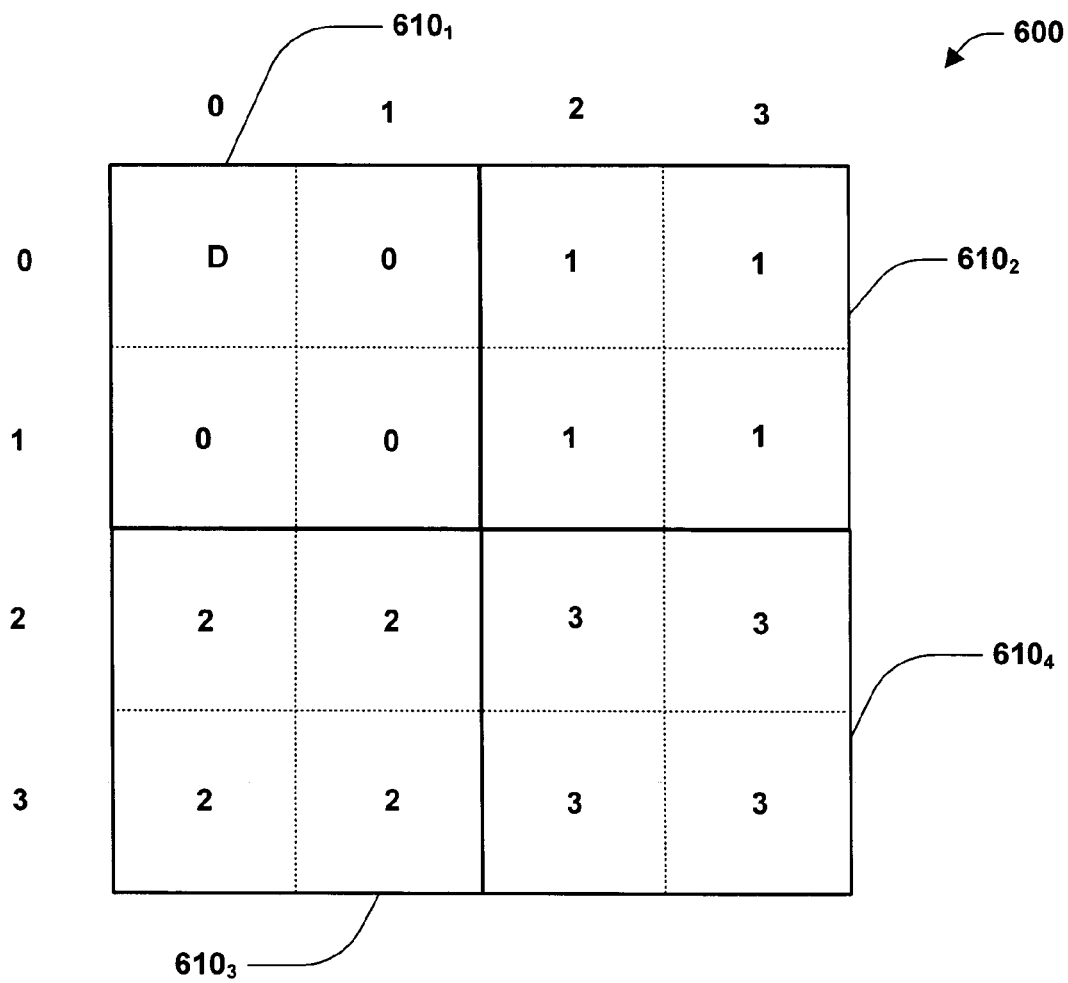
FIG. 6 is a block diagram illustrating a four by four data block in accordance with an aspect of the present invention.
Figure 8:
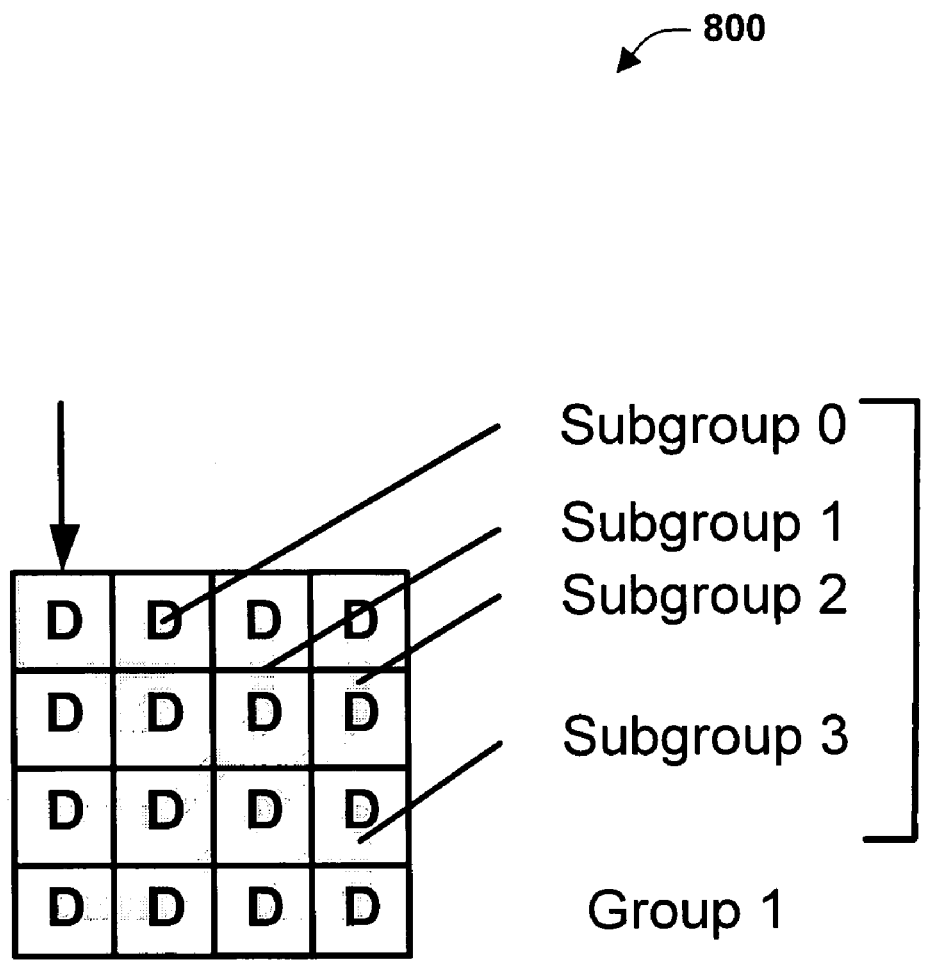
FIG. 8 is a block diagram illustrating a scanning pattern for a four by four block of second level coefficients in accordance with an aspect of the present invention.

In a fourth example, the quantized coefficients are scanned in a different but still fixed (data-independent) pattern (e.g., to avoid random data access). Referring briefly to FIG. 6, a four by four block of coefficients is illustrated in accordance with an aspect of the present invention. Next, turning to FIG. 7, a Peano-like scanning pattern for a sixteen by sixteen data macroblock (a group of L blocks, in this case L=4) in accordance with an aspect of the present invention is illustrated. FIG. 8 illustrates a scanning pattern for a four by four block of second level coefficients (such as those generated by the secondary lapped transform of 320, 420, or 520) in accordance with an aspect of the present invention.

For each macroblock (e.g., generated by an hierarchical cascade of 4×4 transforms), the transform value is read into one of six groups of coefficients. Consecutive values of each group are read from M consecutive macroblocks (a "chunk"), and the six groups are concatenated as one 256M-long vector that is sent to the entropy coder. Thus, each chunk can be encoded independently. Independent encoding allows for each chunk to be independently decoded, thus allowing for only a portion of the picture bitmap to be decoded, if so desired.

The scanning pattern set forth in FIGS. 7 and 8 is a combination of a spatial-frequency-ordered scan for the DC coefficients (e.g., that went through two levels of LBT) and a Peano plus spatial-frequency-ordered scan for the AC coefficients (e.g., which went through only the first level of LBT). The Peano component (the shaded arrow pattern in FIG. 7) is used so that for each group of AC coefficients that are adjacent in a particular group come from adjacent 4×4 blocks.

Thus, Group 0 comprises a particular second level DC coefficient that passed through the second level LBT of each macroblock. Group 1 through Group 5 scanning can then be performed for each macroblock with Group 1 through Group 5 scanning then being performed for the next macroblock and so on. Group 1 comprises, for a macroblock, the remaining DC coefficients that went through the second level LBT for the macroblock. Group 2 comprises, for each LBT block of the macroblock, the illustrated coefficient values. Group 3 comprises, for each LBT block of the macroblock, the illustrated coefficient values. Group 4 comprises, for each LBT block of the macroblock, the illustrated coefficient values. Group 5 comprises, for each LBT block of the macroblock, the illustrated coefficient values.

Referring back to FIG. 1, the entropy encoder 150 encodes the quantized coefficients received from the quantizer 130 and/or the scanner 140. The color space mapper 110, multi-resolution lapped transform 120, the quantizer 130 and/or the scanner 140 have converted original pixel data into a vector of integer numbers with a reduced dynamic range and long strings of zeros—though no data compression. The entropy encoder 150 encodes these quantized coefficients, thus resulting in data compression.

In one example, an adaptive run-length coder is utilized by the encoder 150. Each bit plane of the input vector is processed in order, starting at the most significant bit (MSB), and ending the least significant bit. For each coefficient, a bit is labeled as "significant", if no nonzero bit has been encoded yet, or "refinement", if a significant bit for that coefficient has already been encoded. Refinement bits are equally likely to be zero or one, so they are copied unmodified to the bit stream. Significant bits are more likely to be zero, and so they are encoded via an adaptive and efficient run-length encoder, which produces symbols according to the rule described in Table 1.

TABLE 1

Run-length encoding rule for significant bits, with parameter k.

| Codeword | Input bit sequence |
| --- | --- |
| 0 | Complete run of $2^k$ zeros |
| 1 c 0 | Partial run of $c < 2^k$ zeros followed by a 1, sign of coefficient = '+' (c is a k-bit number) |
| 1 c 1 | Partial run of $c < 2^k$ zeros followed by a 1, sign of coefficient = '−' |

The parameter k controls the compression efficiency of the run-length encoder. The larger the value of k, the longer the string of zero bits that can be represented by a codeword consisting of a single bit=0, and thus the higher the compression. The parameter k can be "tuned" to the statistics of the data such that that $2^k$ is approximately equal to the most likely length of strings of zeros.

In traditional run-length coding, the parameter k is either fixed or regularly updated and added to the bit stream (because the decoder needs to know of any changes in k). Both approaches can lead to a significant performance penalty, though, for two reasons. First, the input data has usually varying statistics, so k needs to be varied in order to track such changes. Second, updating the value of k by copying it into the bit stream adds significant overhead, because several bits are needed to represent the value of k.

Thus, in the adaptive run-length coder of this example, a backward adaptation rule for k is used. By backward it is meant that k is adjusted based on the encoded symbols, not on the input data. Thus, as long as encoder and decoder use the same adaptation rules, the values of k need not be transmitted. The basic adaptation rule is quite simple. If the codeword is zero, that means a run of zeros has just been observed, it is anticipated that runs of zeros are more likely, and thus k is increased. If the codeword starts with a 1, that means an incomplete run has just been observed, so it is anticipated that runs of zeros are less likely, and thus k is reduced.

Integer increases in k can lead to too fast of adaptation with a resultant penalty in compression performance. Accordingly, k can be adjusted by fractional amounts (e.g., by increasing and decreasing a scaled version of k).

The run-length encoding symbols can be terminated at the end of each bit plane and a field with the length of the encoded data for each bit plane added. Accordingly, the bit stream can be parsed and the least significant bit plate can be removed, if desired. This is equivalent to re-encoding the data with half the step size. Thus, recompressing that data be accomplished by simply parsing out some bits from the compressed file. As such, fidelity scalability can be achieved.

It is to be appreciated that numerous other entropy encoding techniques (e.g., adaptive arithmetic encoding) are contemplated, conducive to facilitating data compression utilizing a multi-resolution lapped transform in connection with the subject invention. Any suitable entropy encoding technique for employment in connection with the present invention is intended to fall within the scope of the appended claims.

While FIG. 1 is a block diagram illustrating components for the picture compression system 100, it is to be appreciated that the color space mapper 110, the multi-resolution lapped transform 120, the quantizer 130, the scanner 140 and/or the entropy encoder 150 can be implemented as one or more computer components, as that term is defined herein. Thus, it is to be appreciated that computer executable components operable to implement the picture compression system 100, the color space mapper 110, the multi-resolution lapped transform 120, the quantizer 130, the scanner 140 and/or the entropy encoder 150 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 9:
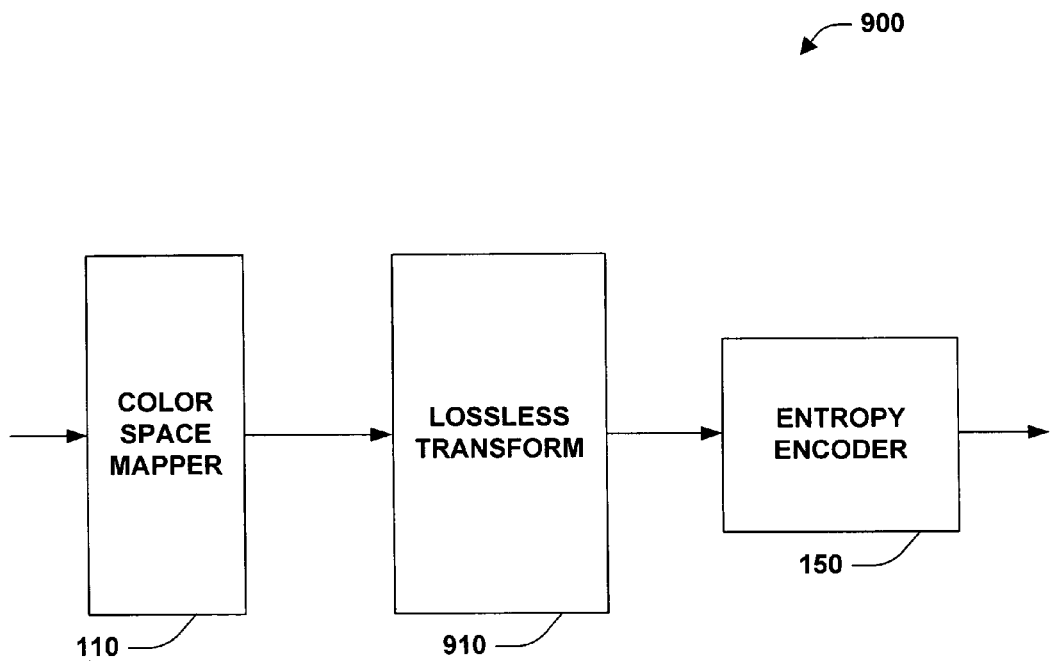
FIG. 9 is a block diagram of a picture compression system in accordance with an aspect of the present invention.

Turning next to FIG. 9, a lossless picture compression system 900 in accordance with an aspect of the present invention is illustrated. The picture compression system 900 includes a color space mapper 110, a lossless transform 910 and an entropy encoder 150.

Figure 10:
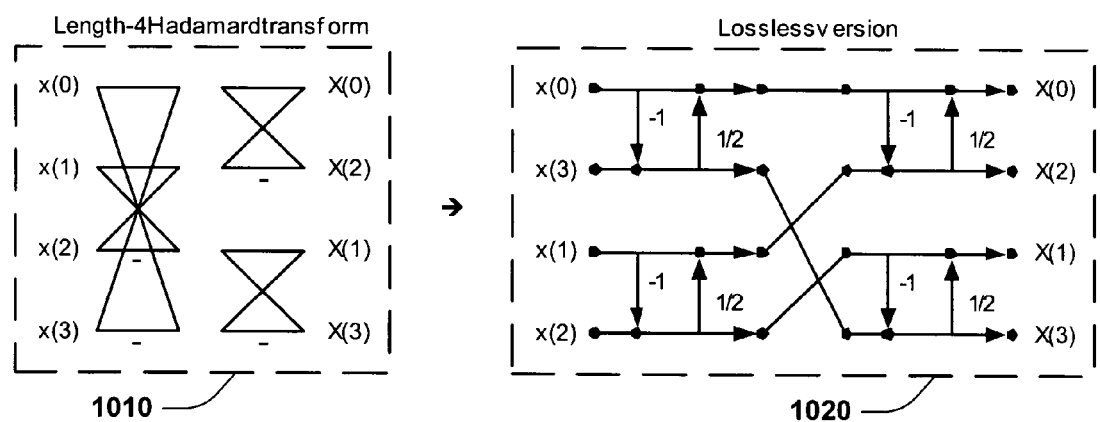
FIG. 10 is a block diagram of a length-4 Hadamard transform in accordance with an aspect of the present invention.

The lossless transform 910 receives input values, for example, from the color space mapper 110. The lossless transform 910 utilizes a lossless transform. For lossless encoding, there is no need to use an overlapping transform, since there won't be blocking artifacts (because there is no quantization involved). For example, a hierarchical Hadamard transform can be utilized by the lossless transform 910. Referring briefly to FIG. 10, the hierarchical transform structure 1010 can be utilized, but with the 4×4 transform modules implemented by the lossless Hadamard structure 1020. It is to be appreciated that the lossless transform 1010 can be implemented as one or more computer components, as that term is defined herein.

Figure 11:
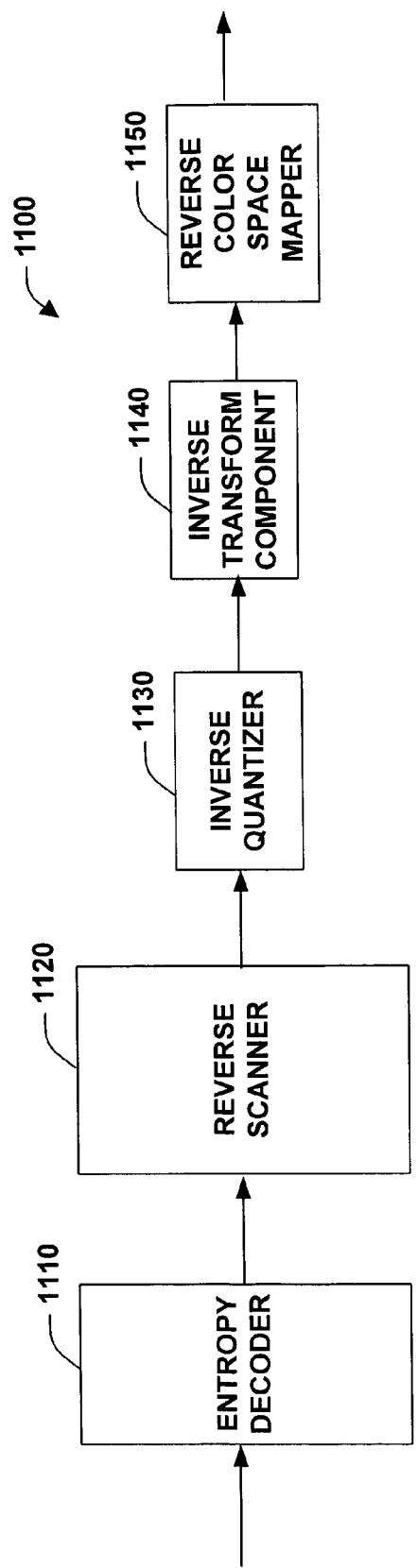
FIG. 11 is a block diagram of a picture decompression system in accordance with an aspect of the present invention.

Turning to FIG. 11, a picture decompression system 1100 in accordance with an aspect of the present invention is illustrated. The system 1100 includes an entropy decoder 1110, a reverse scanner 1120, an inverse quantizer 1130, an inverse transform component 1140 and a reverse color space mapper 1150.

The entropy decoder 1110 receives a bit stream (e.g., produced by a corresponding entropy encoder) and decodes the bit stream. In one example, the entropy decoder 1110 utilizes an adaptive run-length decoder similar in operation to that described above with regard to the encoder 150.

The reverse scanner 1120 reverse scans the entropy decoded input bit stream received from the entropy decoder 1110. The reverse scanner 1120 provides an output of quantized first transform coefficients and/or quantized second transform coefficients to the inverse quantizer 1130.

In one example, the reverse scanner 1120 utilizes row-wise reverse scanning, while in another example, the reverse scanner utilizes reverse column-wise scanning. In yet another example, the reverse scanner 1120 utilizes a zigzag pattern, such as in conventional JPEG data compression systems. In a fourth example, the entropy decoded input bit stream is scanned in a different but still fixed (data-independent) pattern (e.g., to avoid random data access), such as a reverse Peano-like scanning pattern.

The inverse quantizer 1130 inverse quantizes the quantized first transform coefficients and/or quantized second transform coefficients received from the reverse scanner 1120. The inverse quantizer 1130 provides an output of unquantized coefficients (e.g., first transform coefficients and/or second transform coefficients).

The inverse transform component 1140 receives output values from the inverse quantizer 1130. In one example, the inverse transform component 1140 utilizes inverse hierarchical lapped bi-orthogonal transforms and provides output values to the reverse color space mapper 1150. For example, the inverse transform component 1140 can employ the inverse of the multi-resolution lapped transform 200 of FIG. 2 (e.g., from right to left). In another example, the inverse transform component 1140 utilizes an inverse lossless transform (e.g., an inverse hierarchical Hadamard transform), for example, to decode a picture bitmap that was originally encoded with the lossless encoding system 900. For example, the inverse transform (e.g., lossless) can essentially revert the computations in the lossless module 1020 (e.g., in reverse order).

The reverse color space mapper 1150 maps input values to an RGB output image. In one example, the reverse color space mapper 1150 maps a YUV representation to an RGB output. In another example, the reverse color space mapper 1150 maps a $YC_oC_g$ representation to an RGB output. It is to be appreciated that numerous other color space representations are contemplated conducive to facilitating data decompression utilizing, for example, an inverse hierarchical bi-orthogonal lapped transform in connection with the subject invention. Any suitable color space representation for employment in connection with the present invention is intended to fall within the scope of the appended claims. Further, any suitable computer process(es) can be performed by the reverse color space mapper 1150 (e.g., integer and/or floating point) in accordance with the present invention.

It is to be appreciated that the entropy decoder 1110, the reverse scanner 1120, the inverse quantizer 1130, the inverse transform 1140 and/or reverse color space mapper 1150 can be computer components.

In view of the exemplary systems shown and described above, methodologies that may be implemented in accordance with the present invention will be better appreciated with reference to the flow charts of FIGS. 12, 13, 14, 16 and 17. While, for purposes of simplicity of explanation, the methodologies is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 12:
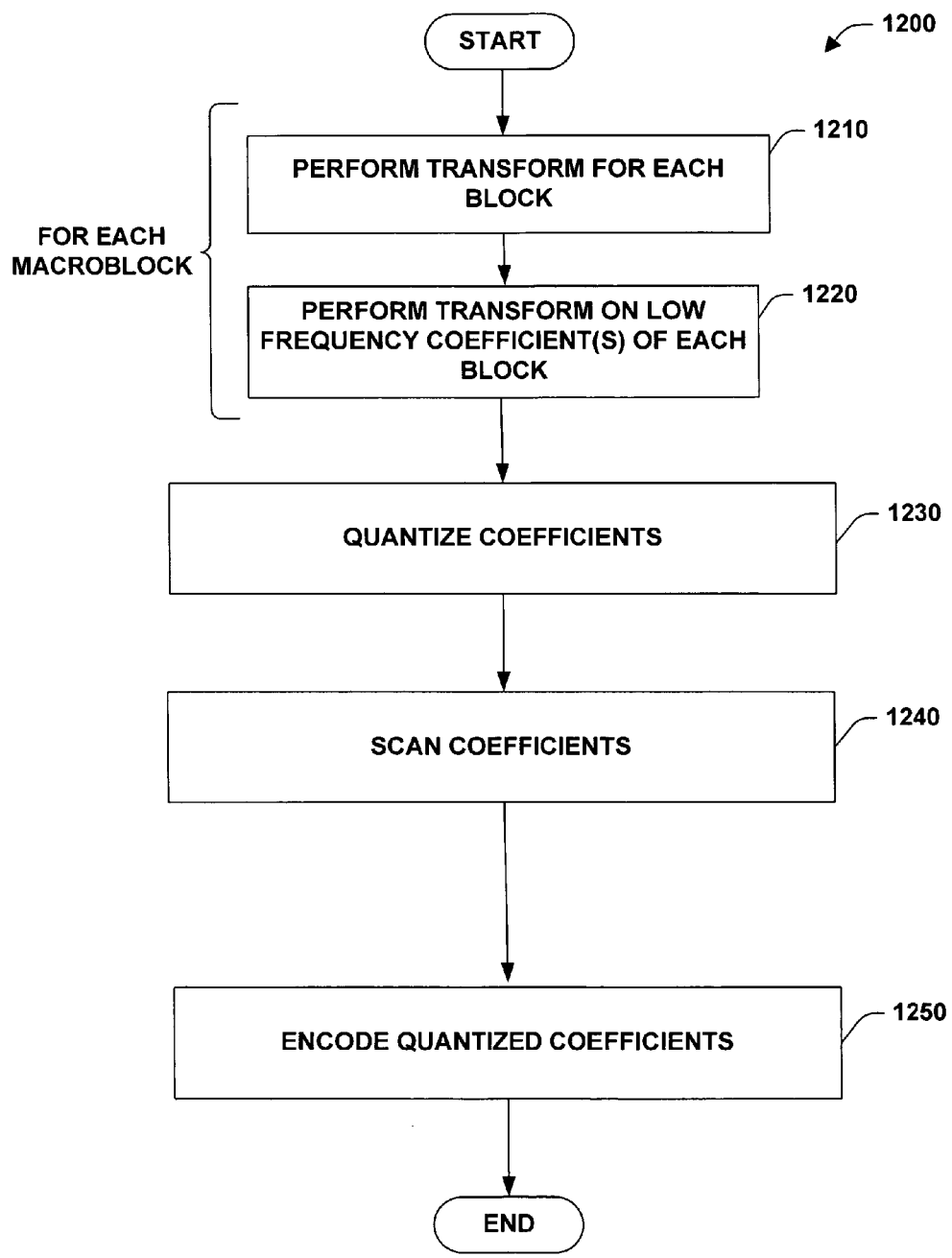
FIG. 12 is a flow chart illustrating a methodology for data compression/encoding in accordance with an aspect of the present invention.

Turning to FIG. 12, a methodology 1200 for data compression/encoding in accordance with an aspect of the present invention is illustrated. At 1210, for each macroblock, a transform for each block is performed. In one example, a bi-orthogonal lapped transform is employed (e.g., lossy mode). In another example, a lossless Hadamard transform (e.g., lossless Hadamard structure 1020) is utilized (e.g., lossless mode). At 1220, a transform is performed on low frequency coefficient(s) of the block. In one example, a bi-orthogonal lapped transform is employed (e.g., lossy mode). In a second example, a lossless Hadamard transform (e.g., lossless Hadamard structure 1020) is utilized (e.g., lossless mode). Next, at 1230, coefficients are quantized. At 1240, the coefficients are scanned. At 1250, the quantized coefficients are encoded.

Figure 13:
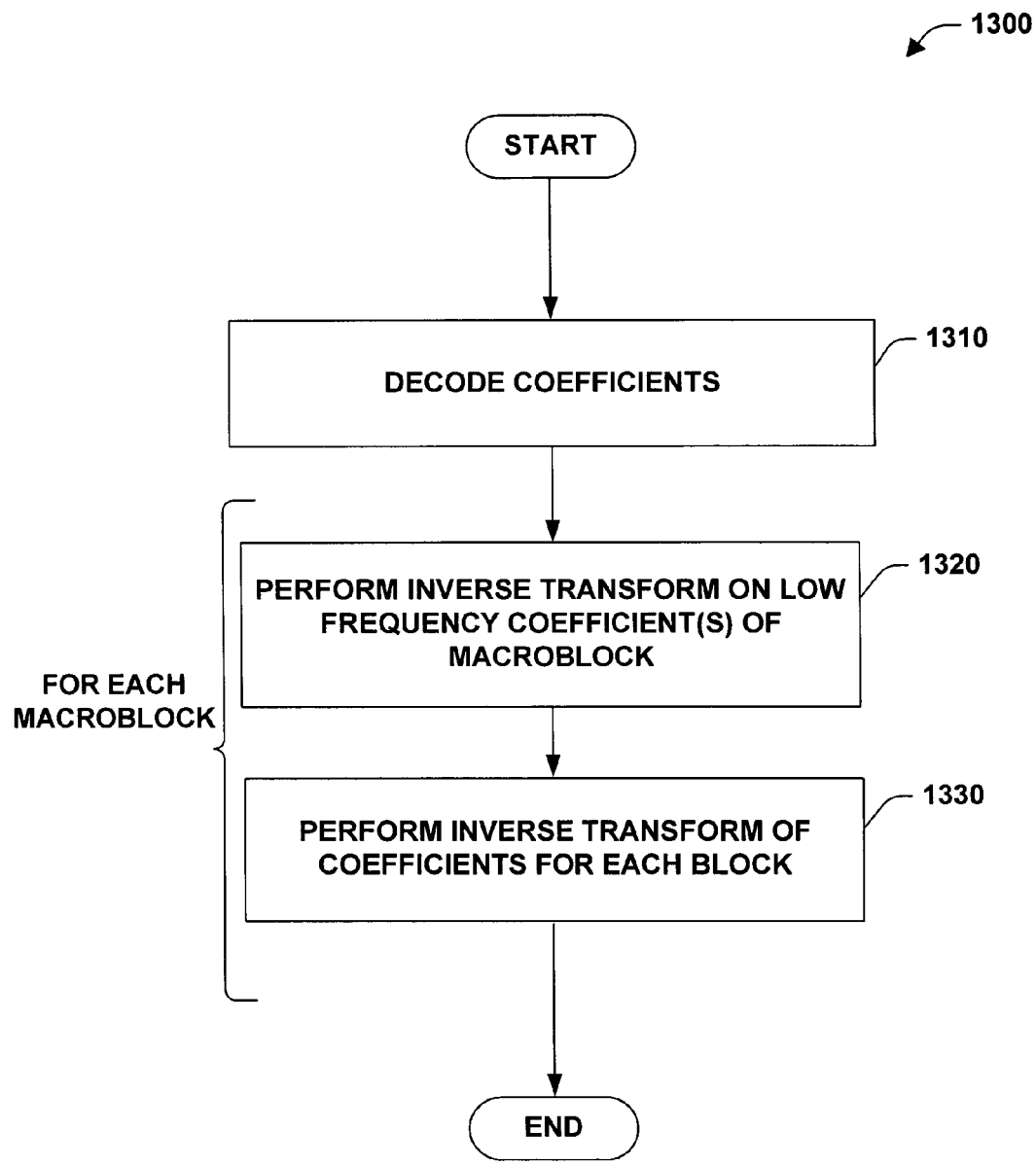
FIG. 13 is a flow chart illustrating a methodology for data decompression/decoding in accordance with an aspect of the present invention.

Referring to FIG. 13, a methodology 1300 for picture decompression/decoding in accordance with an aspect of the present invention is illustrated. At 1310, coefficients are decoded. At 1320, for each macroblock, an inverse transform is performed on low frequency coefficient(s) for each block. In one example, an inverse bi-orthogonal lapped transform is utilized (e.g., lossy mode). In another example, an inverse lossless Hadamard transform is employed (e.g., lossless mode). At 1330, an inverse transform is performed on coefficients for each block. In one example, an inverse bi-orthogonal lapped transform is utilized (e.g., lossy mode). In a second example, an inverse lossless Hadamard transform is employed (e.g., lossless mode).

Figure 14:
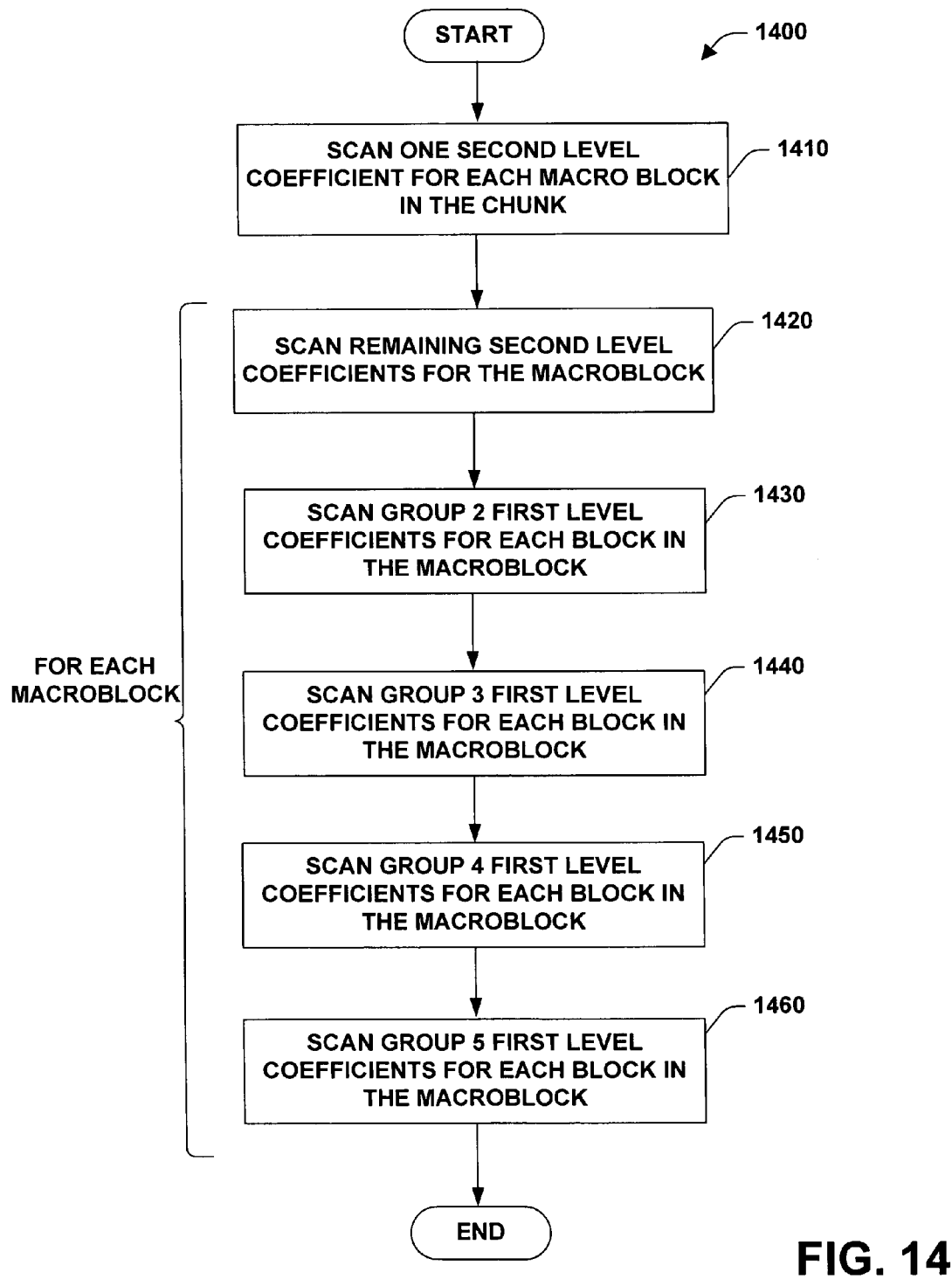
FIG. 14 is a flow chart illustrating a methodology for scanning a chunk of coefficients in accordance with an aspect of the present invention.

Next, referring to FIG. 14, a methodology 1400 for scanning a chunk of coefficients in accordance with an aspect of the present invention is illustrated. At 1410, one second level coefficient (e.g., DC component) for each macroblock in the chunk is scanned. Next, at 1420, for each macroblock in the chunk, the remaining second level coefficients for the macroblock are scanned. At 1430, group 2 first level coefficients (e.g., AC components) for each block in the macroblock are scanned. At 1440, group 3 first level coefficients for each block in the macroblock are scanned. At 1450, group 4 first level coefficients for each block in the macroblock are scanned. At 1460, group 5 first level coefficients for each block in the macroblock are scanned. If there are any more macroblocks in the chunk which have not been scanned, scanning continues at 1420. In the exemplary scanning methodology just described, six groups of transform coefficients are generated (groups 0 to 5). While it is believed that such a scanning and grouping arrangement produces good compression results, any other suitable scanning and grouping pattern can be employed, for example, if compression performance can be sacrificed for faster processing. Any such scanning/grouping pattern for employment in connection with the present invention is intended to fall within the scope of the appended claims.

Figure 15:
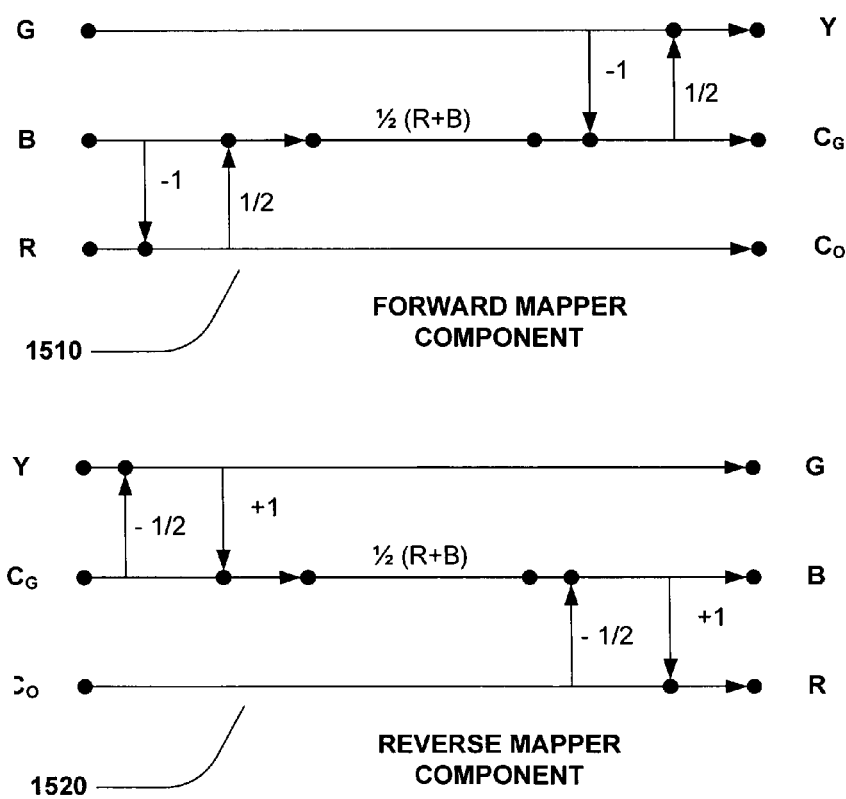
FIG. 15 is a block diagram illustrating a lossless color space forward mapper component and a reverse mapper component in accordance with an aspect of the present invention.

Turning to FIG. 15, a forward mapper component 1510 (e.g., for use by the color mapper 110) is illustrated. The forward mapper component 1510 provides for the original RGB input components to be mapped to the space $YC_oC_g$ (e.g., through scaled versions of Equation (1)). The scaling is such that divisions by 2 are required (as indicated by arrows labeled with ½), and those can be implemented by right shifts, as previously described. At first it might appear that the errors introduced by such shifts would be irrecoverable. However, in a reverse mapper component 1520, the outputs of the forward mapper component 1510 are applied in reverse order, such that truncations due to shifts (e.g., the same as in the forward mapping component 1510) happen, but their effects are now subtracted (as indicated by arrows labeled with −½), thus allowing for recovery of the original data. Thus, the reverse mapper component 1520 can recover the original RGB input components (e.g., exactly) from the $YC_oC_g$ components.

Figure 16:
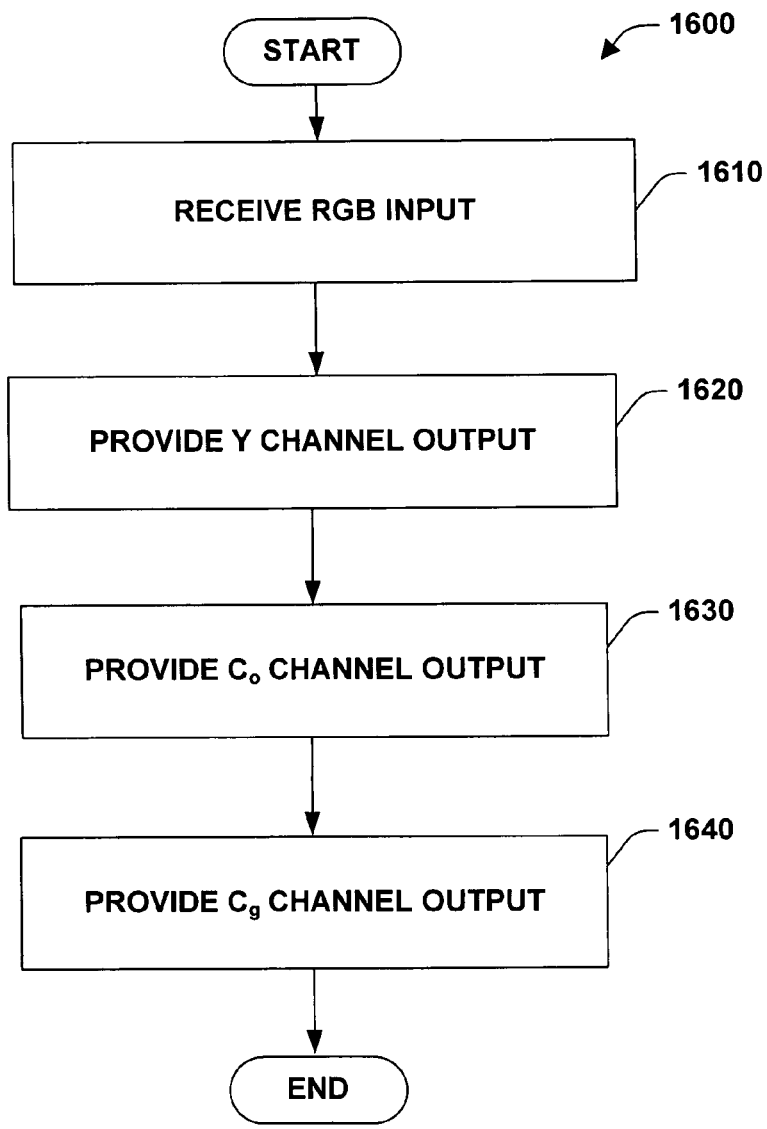
FIG. 16 is a flow chart illustrating a methodology for color space mapping in accordance with an aspect of the present invention.

Referring next to FIG. 16, a methodology 1600 for color space mapping is illustrated. For example, the methodology 1600 can be employed by a forward mapper component 1510.

At 1610, an RGB input is received (comprising an R component, a G component and a B component). At 1620, a Y channel output comprising a representation of average light intensity (luminance) of the RGB input is provided. The Y channel can be provided based on transform (1) above (e.g., Y being based, at least in part, upon R+2G+B). In one example, the Y channel can be provided by using additions and/or shifts of information associated with the RGB input—without multiplications.

At 1630, a $C_o$ channel output comprising a representation of color information (chrominance) of the RGB input across a near orange direction is provided. The $C_o$ channel can be provided based on transform (1) above (e.g., $C_o$ being based, at least in part, upon 2R−2B). In one example, the $C_o$ channel can be provided by using additions and/or shifts of information associated with the RGB input—without multiplications.

At 1640, a $C_g$ channel output comprising a representation of color information (chrominance) of the RGB input across a near green direction is provided. The $C_g$ channel can be provided based on transform (1) above (e.g., $C_g$ being based, at least in part, upon −R+2G−B). In one example, the $C_g$ channel can be provided by using additions and/or shifts of information associated with the RGB input—without multiplications.

In another example, the R component, the G component and/or the B component is able to be recovered by reverse mapping of the $YC_oC_g$ channels provided according to the methodology 1600.

Figure 17:
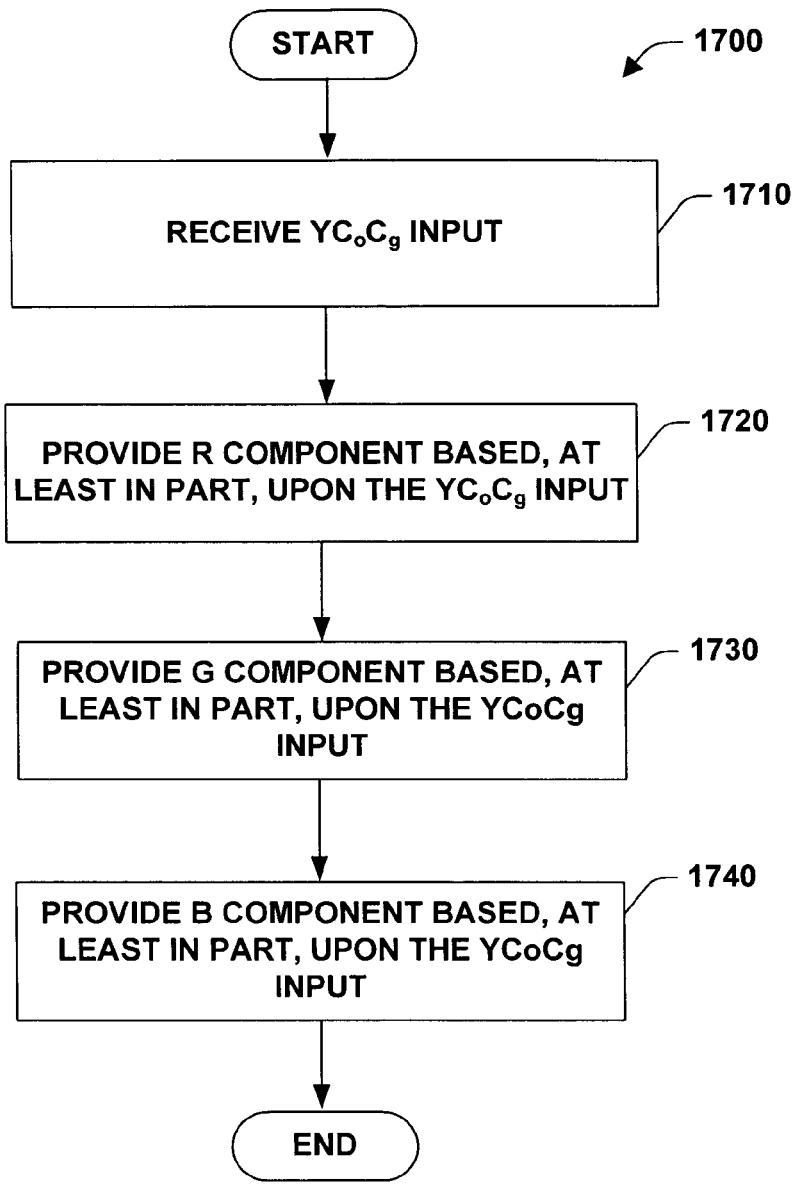
FIG. 17 is a flow chart illustrating a methodology for reverse color space mapping in accordance with an aspect of the present invention.

Turning next to FIG. 17, a methodology 1700 for reverse color space mapping is illustrated. For example, the methodology 1700 can be employed by a reverse mapper component 1520.

At 1710, a $YC_oC_g$ input comprising a Y channel representing an average light intensity, a $C_o$ channel representing color information across a near orange direction, and a $C_g$ channel representing color information across a near green direction is received. At 1720, an R component based, at least in part, upon the $YC_oC_g$ input is provided. The R component can be provided based on transform (1) above (e.g., R being based, at least in part, upon $Y+C_o-C_g$). In one example, the R component can be provided by using additions and/or shifts of information associated with the $YC_oC_g$ input—without multiplications.

At 1730, a G component based, at least in part, upon the $YC_oC_g$ input is provided. The R component can be provided based on transform (1) above (e.g., G being based, at least in part, upon $Y+C_g$). In one example, the G component can be provided by using additions and/or shifts of information associated with the $YC_oC_g$ input—without multiplications.

At 1740, a B component based at least in part, upon the $YC_oC_g$ input is provided. The B component can be provided based on transform (1) above (e.g., B being based, at least in part, upon $Y+C_o-C_g$). In one example, the B component can be provided by using additions and/or shifts of information associated with the $YC_oC_g$ input—without multiplications.

It is to be appreciated that the system and/or method of the present invention can be utilized in an overall compression system facilitating compression of text, handwriting, drawings, pictures and the like. Further, those skilled in the art will recognize that the system and/or method of the present invention can be employed in a vast array of document image applications, including, but not limited to, photocopiers, document scanners, optical character recognition systems, PDAs, fax machines, digital cameras, digital video cameras and/or video games.

Figure 18:
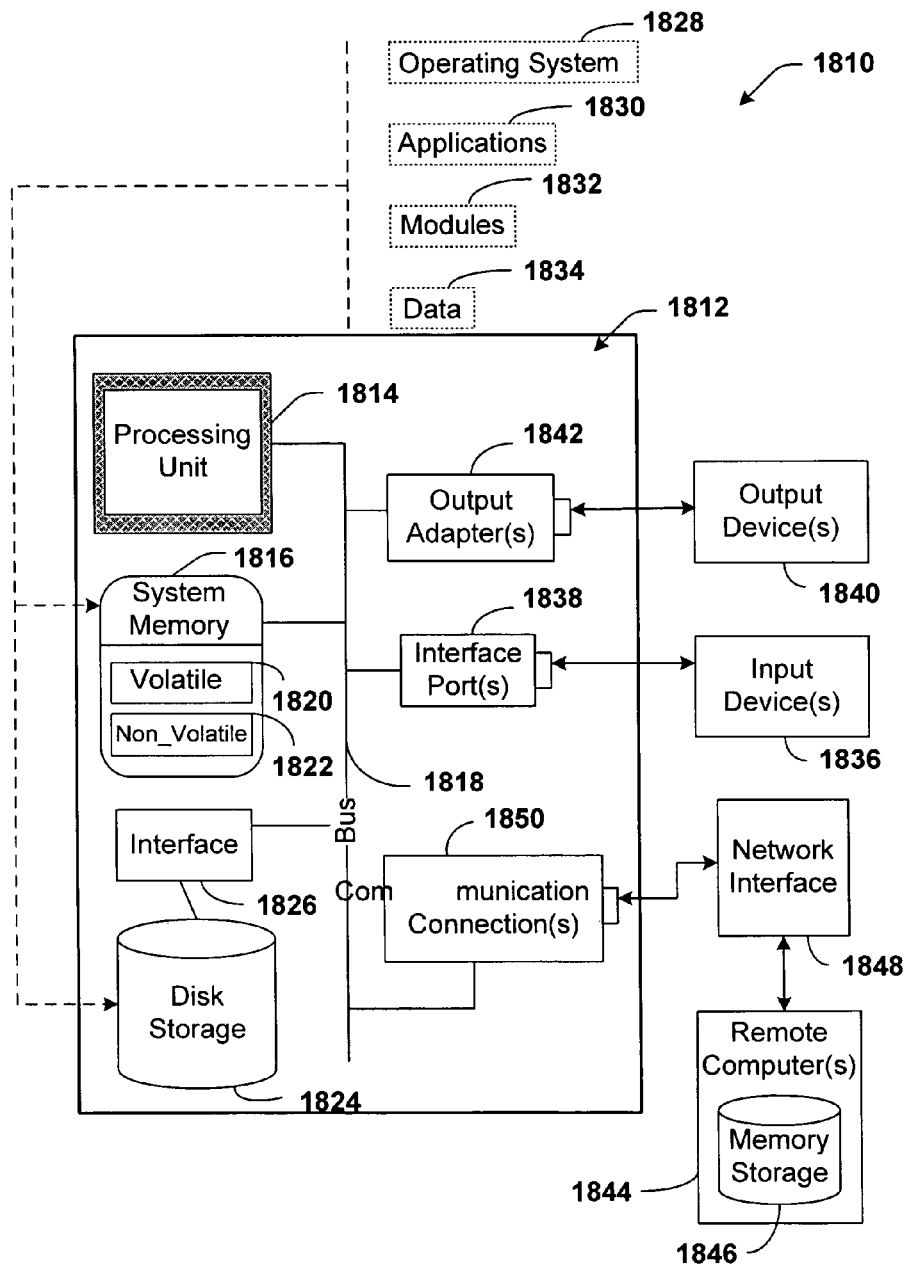
FIG. 18 illustrates an example operating environment in which the present invention may function.
Figure 19:
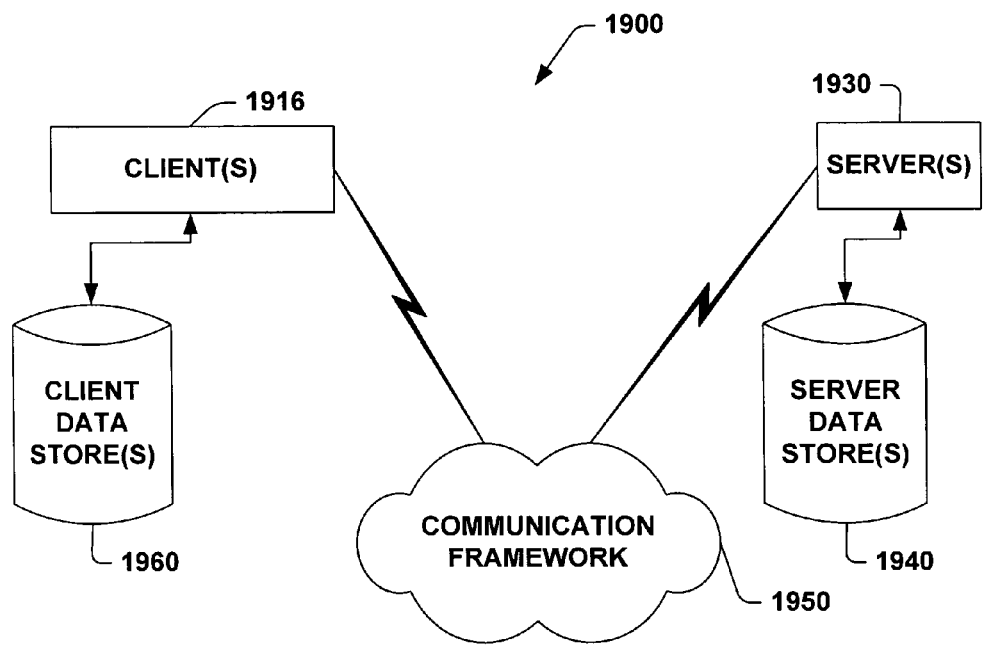
FIG. 19 is a schematic block diagram of an exemplary communication environment in accordance with the present invention.

In order to provide additional context for various aspects of the present invention, FIG. 18 and the following discussion are intended to provide a brief, general description of a suitable operating environment 1810 in which various aspects of the present invention may be implemented. FIG. 19 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 18, an exemplary environment 1810 for implementing various aspects of the invention includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 18-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/nonremovable, volatile/nonvolatile computer storage media. FIG. 18 illustrates, for example a disk storage 1824. Disk storage 1824 includes, but is not limited to, devices like a magnetic disk drive, floppy disk drive, tape drive, Jazz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the present invention can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the possessing unit 1816 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers among other output devices 1840 that require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1502.3, Token Ring/IEEE 1502.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample computing environment 1900 with which the present invention can interact. The system 1900 includes one or more client(s) 1910. The client(s) 1910 can be hardware and/or software (e.g., threads, processes, computing devices). The system 1900 also includes one or more server(s) 1930. The server(s) 1930 can also be hardware and/or software (e.g., threads, processes, computing devices). The server(s) 1930 can house threads to perform transformations by employing the present invention, for example. One possible communication between a client 1910 and a server 1930 may be in the form of a data packet adapted to be transmitted between two or more computer processes. The system 1900 includes a communication framework 1950 that can be employed to facilitate communications between the client(s) 1910 and the server(s) 1930. The client(s) 1910 are operably connected to one or more client data store(s) 1960 that can be employed to store information local to the client(s) 1910. Similarly, the server(s) 1930 are operably connected to one or more server data store(s) 1940 that can be employed to store information local to the server(s) 1930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method for picture data compression/encoding, comprising:
   providing first level coefficients based, at least in part, upon a bi-orthogonal lapped transform of input values; and,
   providing second level coefficient based, at least in part, upon a bi-orthogonal lapped transform of first level coefficients.

2. The method of claim 1, further comprising:
   mapping an input image to a $YC_oC_g$ representation of the input image; and
   providing the $YC_oC_g$ representation as input values to the first lapped bi-orthogonal transform.

3. The method of claim 1, further comprising:
   mapping an input image to a YUV representation of the input image; and
   providing the YUV representation as input values to the first lapped bi-orthogonal transform.

4. The method of claim 1, further comprising at least one of the following acts:
   quantizing the first level coefficients;
   quantizing the second level coefficient;
   scanning at least one of the first level coefficients and the second level coefficient; and,
   encoding at least one of the first level coefficients and the second level coefficient.

5. The method of claim 4, wherein the first and second level coefficients are scanned using, at least in part, a Peano-like scanning order.

6. The method of claim 4, wherein the first and second level coefficients are encoded using an entropy encoder that digitally entropy encodes the quantized coefficients.

7. The method of claim 1, further comprising;
   utilizing integer math in performing the lapped bi-orthogonal transform of the input values.

8. The method of claim 1, further comprising;
   utilizing floating point math in performing the lapped bi-orthogonal transform of the input values.

9. A computer implemented method for scanning quantized multi-resolution lapped transform coefficients of a data chunk, comprising:
   scanning at least one second level coefficient for each macroblock in the chunk;
   scanning the remaining second level coefficients for the macroblock; and
   scanning a second group of first level coefficients for each block in the macroblock.

10. The method of claim 9, further comprising scanning a third group of first level coefficients for each block in the macroblock.

11. The method of claim 10, further comprising scanning a fourth group of first level coefficients for each block in the macroblock.

12. The method of claim 11, further comprising scanning a fifth group of first level coefficients for each block in the macroblock.

13. A data packet stored on a computer readable medium, the data packet comprising:
   a data field comprising first transform coefficients based, at least in part, upon a lapped bi-orthogonal transform of input values;
   second transform coefficients based, at least in part, upon a lapped bi-orthogonal transform of at least one first transform coefficient and, a quantizer that quantizes at least one of the first transform coefficients and the second transform coefficient, the quantizer providing an output of quantized coefficients.

14. The data packet of claim 13, further comprising a color space mapper that maps an input image to a $YC_oC_g$ representation of the input image, the color space mapper provides the $YC_oC_g$ representation as input values to the lapped bi-orthogonal transform.

15. The data packet of claim 13, further comprising a color space mapper that maps an input image to a YUV representation of the input image, the color space mapper provides the YUV representation as input values to the lapped bi-orthogonal transform.

16. The data packet of claim 13, further comprising a scanner that scans the quantized coefficients.

17. The data packet of claim 16, further comprising an entropy encoder that digitally entropy encodes the quantized coefficients.

18. The data packet of claim 13, wherein the lapped bi-orthogonal transform utilizes integer math in performing the lapped bi-orthogonal transform of the input values.

19. The data packet of claim 13, wherein the lapped bi-orthogonal transform utilizes floating point math in performing the lapped bi-orthogonal transform of the input values.

* * * * *